United States Patent [19]

Takeuchi et al.

[11] Patent Number: 4,701,692
[45] Date of Patent: Oct. 20, 1987

[54] RECTIFYING SYSTEM FOR MAGNET-TYPE AC GENERATOR

[75] Inventors: Hirotaka Takeuchi, Tokoname; Jiro Asai, Kariya; Yasuhumi Yamada; Sumio Yanase, both of Okazaki, all of Japan

[73] Assignee: Nippondenso Co., Ltd., Kariya, Japan

[21] Appl. No.: 828,741

[22] Filed: Feb. 12, 1986

[30] Foreign Application Priority Data

Feb. 15, 1985 [JP] Japan .................................. 60-28925
Jul. 8, 1985 [JP] Japan ................................ 60-149656

[51] Int. Cl.⁴ ............................................. H02J 7/24
[52] U.S. Cl. ....................................... 322/90; 320/59; 320/61; 322/94
[58] Field of Search ...................... 322/28, 89, 90, 94; 320/DIG. 2, 57, 59, 61

[56] References Cited

U.S. PATENT DOCUMENTS 3,427,528  2/1967  Custer ........................... 320/DIG. 2
3,617,852  11/1971 Phoenix ................................. 320/61
3,930,197  12/1975 Saylor ....................... 320/DIG. 2 X
4,128,799  12/1978 Morishima ............................ 322/28
4,451,749  5/1984  Kanayama ........................... 310/62
4,455,598  6/1984  Andre .................................. 363/87

FOREIGN PATENT DOCUMENTS 1365248  5/1964  France ................................. 322/89
44-4451   4/1969  Japan .
56-150933 2/1981  Japan .

Primary Examiner—R. J. Hickey
Attorney, Agent, or Firm—Cushman, Darby & Cushman

[57] ABSTRACT

A rectifying system for a magnet-type AC generator comprises a rectifier circuit including a composite bridge of a plurality of diodes and a plurality of thyristors for regulating and rectifying the output voltage of the AC generator, a first phase control circuit for applying a firing signal to the thyristors, a neutral-point diode, a neutral-point thyristor, and a second phase control circuit for controlling the phase of the neutral-point thyristor. The neutral-point thyristor is phase-controlled, and the voltage applied to a battery with an electrode thereof connected to the diodes is thereby regulated.

4 Claims, 17 Drawing Figures

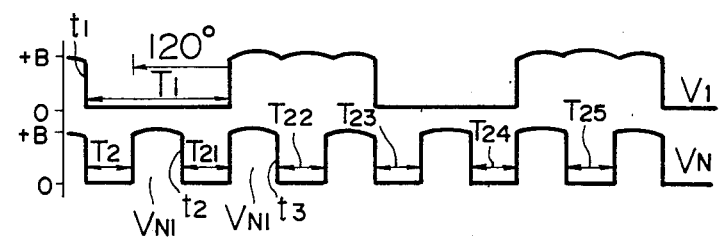
FIG. 7(a)
FIG. 7(b)
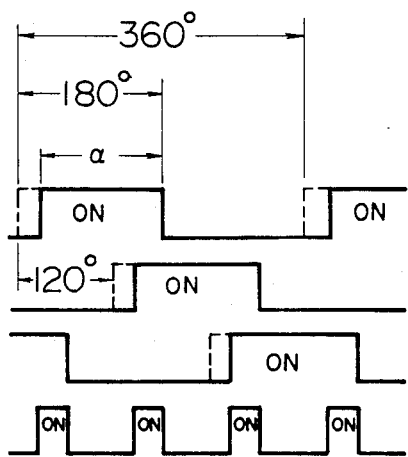
FIG. 8(a)
FIG. 8(b)
FIG. 8(c)
FIG. 8(d)
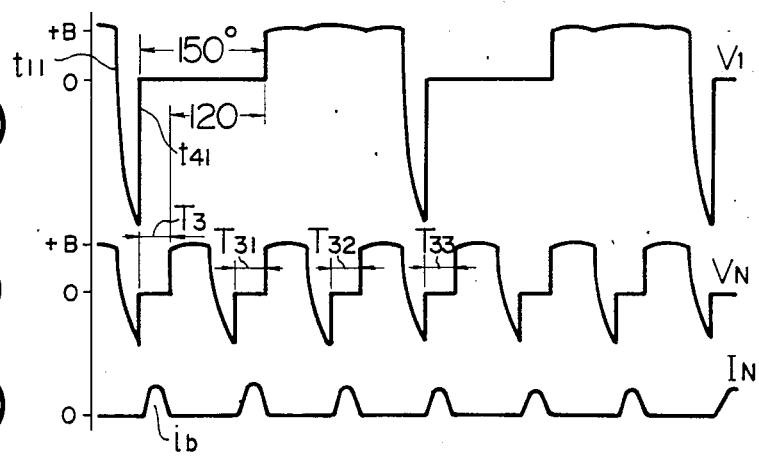
FIG. 9(a)
FIG. 9(b)
FIG. 9(c)

RECTIFYING SYSTEM FOR MAGNET-TYPE AC GENERATOR

BACKGROUND OF THE INVENTION

1. Field of The Invention

The present invention relates to a rectifying system having the function to regulate the output voltage of a magnet-type AC generator used for charging a battery such as one mounted on an automotive vehicle.

2. Description of The Prior Art

A conventional winding-type AC generator has an armature winding that is connected in multiple phases, or is Y-connected in three phases, for example. In this kind of generator, the neutral point of the armature winding is connected to at least one of the DC output terminals of a three-phase full-wave rectifier circuit through a pair of diodes at a neutral point. This allows the third high-harmonic voltage generated at the neutral point is taken out by full-wave rectification through a neutral-point diode in order to increase the rectified output current, as is well known (eg. see Japanese Pat. Publication No. 4451/65).

This well-known circuit has been used with an alternator for charging the automotive battery. This alternator comprises an electromagnet and a slip ring in the field section thereof making up a rotor.

For regulating the output voltage of the alternator, the voltage applied to the electromagnet through the slip ring is regulated through a voltage regulator.

The regulator operates in such a manner that a transistor continues to turn on and off to adjust the effective value of the voltage applied to the electromagnet.

The present trend, however, is toward "magnetization" of the alternator, that is, the electromagnet of the field section is being replaced by a permanent magnet. Since the magnetic fluxes of the field section cannot be controlled, however, the phase of the output voltage is required to be controlled by a thyristor.

For this purpose, at least three of the six diodes in Gratz connection for full-wave rectifying the three-phase AC output, for instance, is are required to be replaced by thyristors. Although the phase of the three-phase AC output is able to be controlled in this way, the half-wave portion of the neutral-point output would be applied to the battery without being phase-controlled at all through one of the neutral-point diodes and the Gratz-connected diodes if a pair of neutral-point diodes are connected to the neutral point as in the prior art disclosed in Japanese Pat. Publication No. 4451/65.

In such a case, the battery voltage does not increase excessively while the magnet-type AC generator is running at low speeds. When the generator speed increases to a point where a high voltage is generated at the neutral point, however, the battery voltage exceeds a target value by a great margin, thereby overcharging the battery. As a result, the idea of increasing the charging capacity of the battery by taking out the neutral-point output through a diode connected at a neutral point has been unavoidably discarded.

SUMMARY OF THE INVENTION

A first object of the present invention is to provide a rectifying system for a magnet-type AC generator for which voltage regulation by phase control is indispensable, in which a part of the output is taken out of a neutral pint of the armature winding, and the output voltage is prevented from being increased excessively while being applied to a battery by being voltage regulated, thus improving the battery-charging ability thereof.

A second object of the present invention is to take out a part of the output from the half-wave portion of the output at the neutral point.

A third object of the present invention is to provide means of taking out a part of the output from the full-wave portion of the output at the neutral point.

A fourth object of the invention is to provide a simple circuit configuration to produce a phase control signal of a neutral-point thyristor for phase-controlling the output at the neutral point.

According to the present invention, there is provided a rectifying system for a magnet-type AC generator having a multiple-phase armature winding with a neutral point, in which the multi-phase output of the armature winding is rectified by a composite bridge including a plurality of thyristors and diodes while at the same time being voltage-regulated.

Since the composite bridge is connected in Gratz fashion, the three-phase AC output obtained between lines of the armature winding is full-wave rectified.

At the same time, the thyristors of the composite bridge are phase-controlled in a manner to prevent the DC output voltage of the composite bridge from becoming excessive against the battery voltage.

A neutral-point diode is inserted between a neutral point of the armature winding and one of the electrodes of the battery. The neutral point is so connected as to flow the output current through the neutral-point diode and the thyristors of the composite bridge in series into the battery.

As a result, the output current at the neutral point flows only when any one of the thyristors in the composite bridge phase-controlled is turned on. The neutral-point output voltage is thus limited by the thyristors.

In other words, according to the present invention, a neutral-point diode is connected between a neutral point and one of the electrodes of the battery as determined by the relationship with the thyristors of the composite bridge, thereby regulating the voltage produced at the neutral point with the thyristors in the composite bridge.

This concept, however, permits only a half-wave portion (and a part of the output depending on the conditions of phase control) to be taken out of the neutral-point output.

It is thus desirable to take out the output corresponding to the full-wave portion of the neutral-point output, that is, to increase the output.

According to the present invention, a neutral-point thyristor is connected in series with the abovementioned neutral-point diode, between the neutral point and that one of the electrodes of the battery which is not connected to the neutral-point diode.

In order to simplify the circuit for producing a phase control signal for the neutral-point thyristor, a phase control signal for the composite bridge is introduced. For this purpose, the phase control signal for a first phase control circuit for producing a phase control signal of the composite bridge is logically processed through a logic circuit, and the output of the logic circuit is used to control the neutral-point thyristor. In this way, a second phase control circuit for controlling the neutral-point thyristor is provided substantially by a logic circuit of simple configuration.

BRIEF DESCRIPTION OF THE DRAWINGS

FIGS. 7(a) and 7(b) show waveforms representing a one-phase voltage and a neutral-point voltage produced when the thyristors are controlled under full conduction (control angle of 180°).

FIGS. 8(a), 8(b), 8(c) and 8(d) show waveforms of the firing signals for the thyristors obtained when the system shown in FIG. 5 is controlled by a control angle of α.

FIGS. 9(a), 9(b) and 9(c) are diagrams showing waveforms representing the one-phase voltage, a neutral-point voltage and a neutral-point current flowing through the neutral-point thyristor when the control angle of 150° is involved in the system of FIG. 5.

DESCRIPTION OF THE PREFERRED EMBODIMENTS (First embodiment)

A first embodiment of the present invention will be explained with reference to the accompanying drawings.

Figure 1:
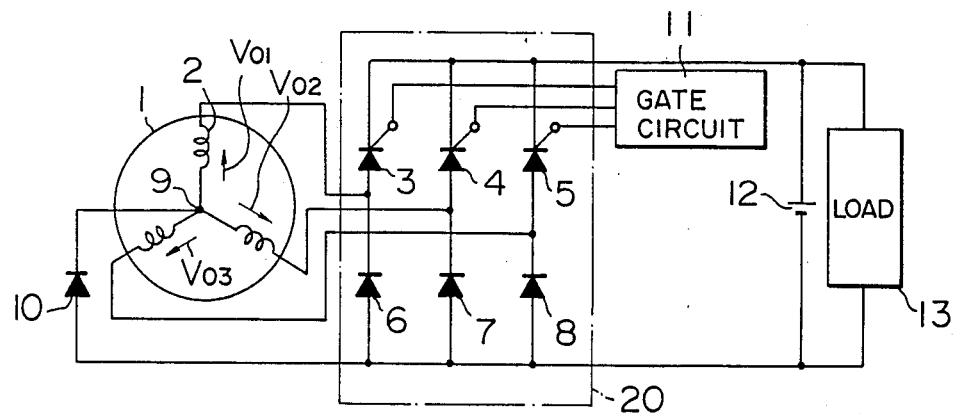
FIG. 1 is an electrical circuit diagram showing a first embodiment of the present invention.
Figure 2:
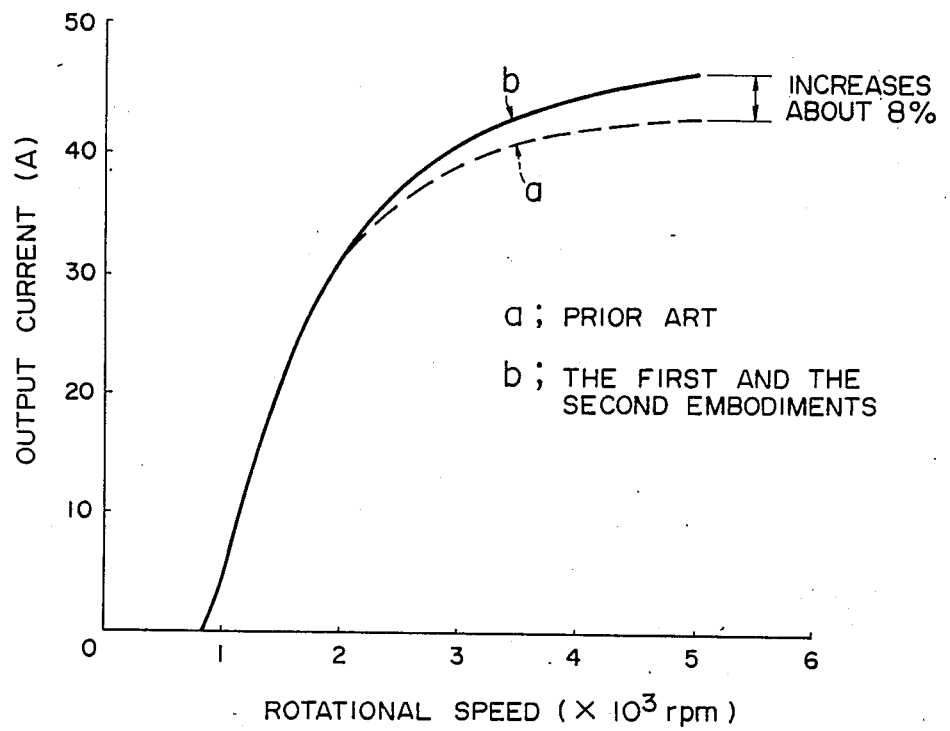
FIG. 2 shows output characteristics comparing a system shown in FIG. 1 according to the present invention with a conventional system.

FIG. 1 is a general circuit diagram of a magnet-type AC generator comprising a rectifying system according to an embodiment of the present invention, and FIG. 2 shows an output current characteristic of the system shown in FIG. 1.

In FIG. 1, reference numeral 1 designates a magnet-type AC generator comprising a Y-connected three-phase armature winding 2 and a rotor having a field magnet not shown. With the rotation of the field magnet, a three-phase AC voltage is induced in the armature winding 2 on the stator side, as well known.

Also, a three-phase full-wave rectifier circuit 20 with the cathodes of phase-controlled thyristors 3, 4 and 5 connected in common, is provided by a composite bridge including a plurality of diodes 6, 7 and 8 with the thyristors 3, 4 and 5 phase-controlled. In this case, the diodes 6, 7 and 8 are connected to one of the electrodes (negative) of a battery 12, the other electrode (positive) of which is connected to the thyristors 3, 4 and 5.

Numeral 10 designates a half-wave rectification neutral-point diode with the cathode thereof connected to the neutral point 9, making up the essential part of the present invention. The anode terminal of this diode 10 is the common anode terminal of the diodes 6, 7 and 8, that is, one of the electrodes (negative in this case) of the battery 12. Numeral 11 designates a well-known gate circuit connected to the gate terminals of the phase-controlled thyristors 3, 4 and 5 for effecting the on-off control of the phase-controlled thyristors in order to keep the battery terminal voltage at a constant level in accordance with the conditions of the battery 12 and a load 13. An example of such a gate circuit 11 is disclosed in Japanese Pat. Laid-Open Publication No. 150933/81 and therefore will not be described in detail here.

Now, the operation of this circuit having the configuration mentioned above will be explained.

In this configuration, the AC phase voltage generated in the armature winding 2 is applied to the anode terminals of the thyristors 3, 4, 5, and after being full-wave rectified by a composite bridge 20 including the thyristors 3, 4, 5 and a plurality of diodes, is taken out as a DC output. At the same time, the neutral-point output current appearing at the neutral point 9, which has a frequency three times higher than the phase voltage, flows into the battery 12 and the load 13 through the neutral-point diode 10. This neutral point output current, superimposed on the full-wave rectified DC output portion of the three-phase AC voltage generated in the armature winding 2, is produced as an output current.

In the process, in view of the fact that the anode terminal of the neutral-point diode 10 is always connected to the anode common terminal of the diodes of the composite bridge, that is, to the grounding terminal of the battery 12 in the embodiment under consideration, the neutral-point output current flows through the neutral-point diode 10 and the thyristors 3, 4, 5, thereby permitting the phase of the neutral-point voltage to be controlled by the phase-controlled thyristors 3, 4, 5. In this case, thyristors 3, 4, 5 are sequentially turned on and off by the trigger signal from the gate circuit 11 and the phase voltage applied to the thyristors 3, 4, 5. As a result, the instant the thyristor 3 is turned on, for instance, a current representing a one-phase portion Vo1 of the neutral-point voltage flows, while a current associated with Vo2 flows when the thyristor 4 is turned on. Similarly, when the thyristor 5 is turned on, a current representing a voltage portion Vo3 flows. Vo1, Vo2 and Vo3 designate the neutral-point voltages of the same phase.

(Second embodiment)

In the configuration of the above-mentioned first embodiment, the common terminal (cathode terminal) of the phase-controlled thyristors 3, 4, 5 are connected to positive side of the battery, and the anode terminals of the neutral-point diode 10 and the diodes 6, 7, 8 are connected to the negative side of the battery. The phase control of the neutral-point voltage is also realizable, however, in similar manner in the opposite case where the anode terminals of the phase-controlled thyristors 3, 4, 5 are connected to the negative side of the battery, while the cathode terminals of the diodes 6, 7, 8 and the neutral-point diode 10 are connected to the positive side of the battery as shown in FIG. 3.

Also, unlike in the aforementioned embodiment using a three-phase magnet-type AC generator, the present invention is similarly applicable to a multiphase magnet-type AC generator such as a six-phase generator having a neutral point.

Figure 3:
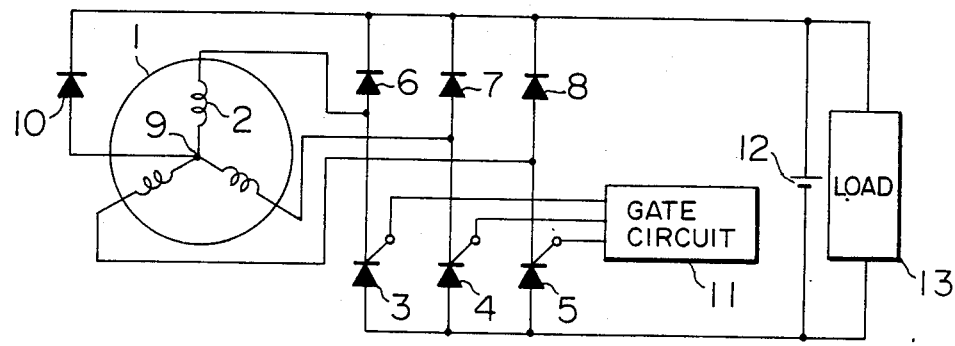
FIG. 3 is an electrical circuit diagram showing a second embodiment of the present invention.
Figure 4:
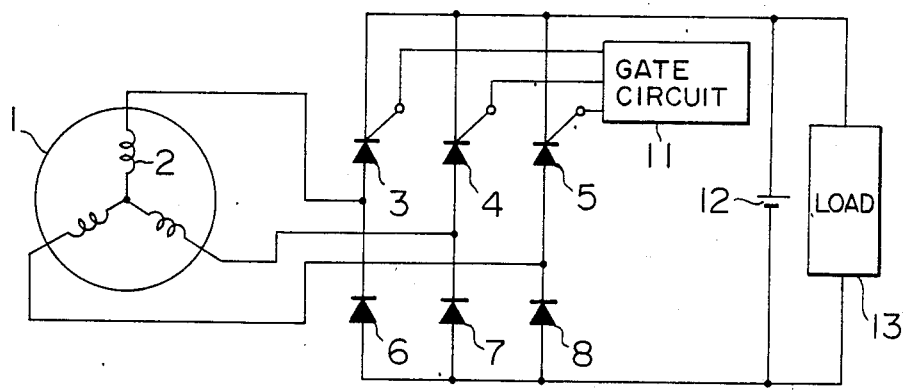
FIG. 4 is an electrical circuit diagram of a conventional system.

Further, apart from the output characteristic diagram comparing the prior art system shown in FIG. 4 with the system of FIG. 1, the system of FIG. 3 also produces an output current about 8% larger as in the circuit of FIG. 1. This is by reason of the fact that a neutral-point output is taken out while the voltage is being regulated through the thyristors 3, 4, 5 in the composite bridge 20 and the neutral-point diode 10.

As described above, there is provided according to the present invention a rectifying system 20 having the function of voltage regulation, including a composite bridge including a plurality of diodes 6, 7, 8 and a plurality of thyristors 3, 4, 5 for regulating the output voltage of a magnet-type AC generator 1, wherein the half-wave portion of a high-harmonic voltage generated at a neutral point 9 of the magnet-type AC generator is capable of being added to the DC unit without adversely affecting the voltage-regulating function, thereby leading to the great advantages of increasing the output at least by several percentage points while at the same time limiting the excess voltage at the neutral point. Further, an abnormally excessive voltage variation which tends to result from the over-voltage at the neutral point is prevented according to the present invention, with the result that the electrical load connected to the battery is not adversely affected by the abnormally high voltage variations, thereby making it possible to configure a power supply of high quality.

(Third embodiment)

Now, explanation will be made of a system for rectifying the full-wave portion of a neutral-point output and using it for charging a battery by voltage regulation.

Figure 5:
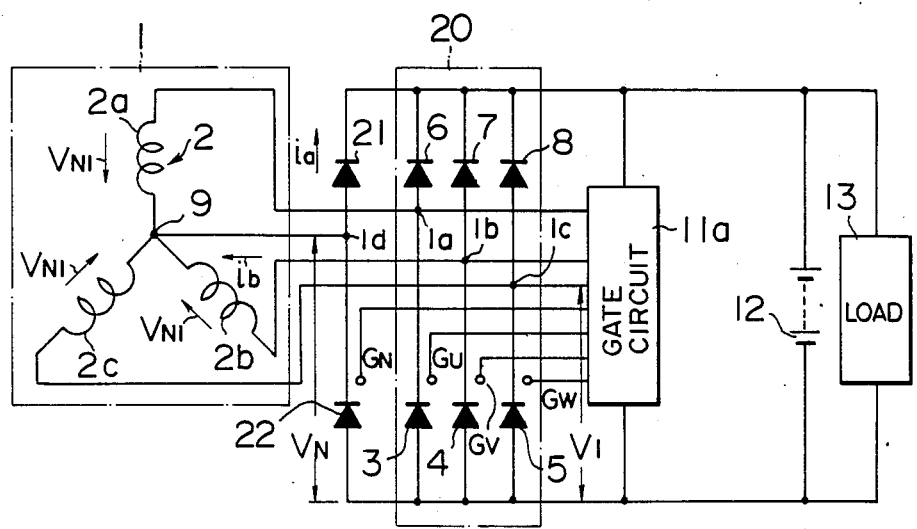
FIG. 5 is an electrical circuit diagram according to third embodiment of the present invention.

In FIG. 5 showing the third embodiment, the reference numerals identical to those in FIG. 1 designate the component elements identical or equivalent to those in FIG. 1.

In the circuit of FIG. 5, a common cathode terminal of a plurality of diodes 6, 7, 8 is connected to one of the electrodes (positive) of a battery 12, and a common anode terminal of a plurality of thyristors 3, 4, 5 is connected to the other terminal (negative) thereof.

Numeral 21 designates a neutral-point diode for half-wave rectification with the node thereof connected to a neutral point 9, and with the cathode terminal thereof connected to a common cathode terminal side of a plurality of diodes 6, 7, 8, that is, to the positive side of the battery 12 in the diagram. Numeral 22 designates a neutral-point thyristor which combines with the neutral-point diode 21 to full-wave rectify the neutral-point output and take it out for charging the battery 12. The neutral-point thyristor 22 has the cathode thereof connected to the neutral point 9 and the anode thereof to the common anode terminal side of the thyristors 3, 4, 5, that is, to the negative side of the battery 12 in the diagram.

Numeral 11a designates a voltage regulator for producing a firing signal to control the phase of the thyristors 3, 4, 5 in the composite bridge and the neutral-point thyristor 22. This voltage regulator 11a makes up a gate circuit for the thyristors 3, 4, 5 and 22, and is connected to the gates of the thyristors 3, 4, 5 and the neutral-point thyristor 22 of the rectifier circuit 20. The voltage regulator 11a controls by turning on and off the thyristors 3, 4, 5 and the neutral-point thyristor 22 in order to keep the battery terminal voltage at substantially a predetermined constant value.

Figure 6:
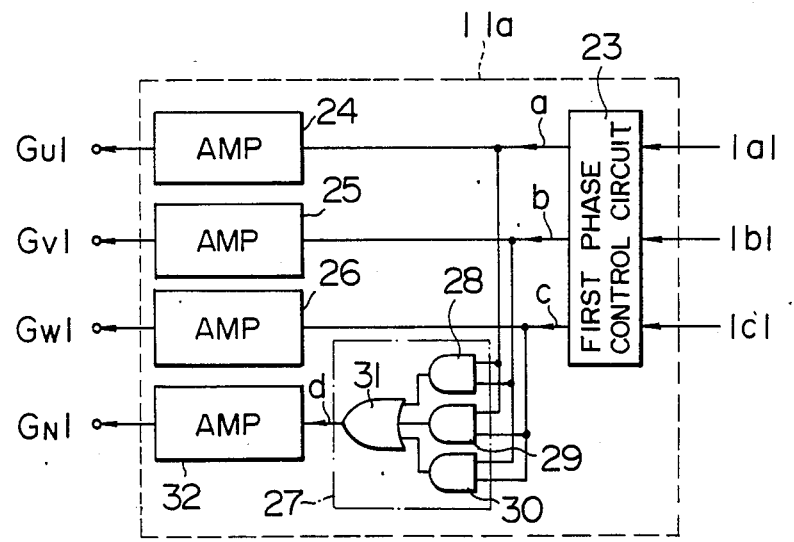
FIG. 6 is a circuit diagram of a voltage regulator shown in FIG. 5.

The above-mentioned voltage regulator 11a is configured as shown in FIG. 6.

In FIG. 6, characters 1a1, 1b1, 1c1 designate input voltage signals connected to respective phase output terminals 1a, 1b, 1c of the armature winding 2. GU1, GB1, GW1 and GN1, on the other hand, designate firing signals for phase control supplied to the gates GU, GV, GW and GN, respectively, of the thyristors 3, 4, 5 and 22.

Numeral 23 designates a first phase control circuit for producing phase control signals for the thyristors 3, 4, 5 (displaced by 120 degree from each other) from the input voltage signals 1a1, 1b1, 1c1 (also displaced by 120 degree in phase from each other) obtained from the phase output terminals 1a, 1b, 1c, respectively. A well-known circuit may be used for this circuit 5.

Numerals 24, 25 and 26 designate amplifiers for amplifying the phase control signals a, b, c making up the outputs of the first phase control circuit 23 and producing the firing signals GU1, GV1, GW1, respectively.

Numeral 27 designates a second phase control circuit including AND circuits 28, 29, 30 and an OR circuit 31, that is, logic circuits.

Numeral 32 designates an amplifier for amplifying the phase control signal d of the second phase control circuit 27 to produce the firing signal GN1 for the neutral-point thyristor 22.

Now, explanation will be made of the operation of the circuit configured as mentioned above. The AC voltages of each phase generated in the armature winding 2 of the magnet-type generator 1, that is, the voltages at the output terminals 1a, 1b, 1c of respective phases are taken out as DC output full-wave rectified at a three-phase full-rectifier circuit 20, and at the same time, a third high-harmonic voltage pulsating at a frequency three times higher than the AC voltages of respective phases flows from the neutral point 9 through the neutral-point diode 21 and the neutral-point thyristor 22 into the battery 12 and the electrical load 13, thus being produced in the form superimposed on the DC portion of the full-wave rectified AC voltage generated in the armature winding 2.

In this case, the one-phase output voltage $V_1$ (the cathode voltage of the thyristor 5 of the composite bridge based on the negative side of the battery 12) and the voltage $V_N$ (the neutral-point voltage based on the negative side of the battery 12) take the forms as shown in FIGS. 7(a) and 7(b) respectively.

FIGS. 7(a) and 7(b) represent the condition in which the thyristors 3, 4, 5 and the neutral-point thyristor 22 are fully conducted by being controlled at the control angle $\alpha$ of 180°, that is, operate as a diode.

The neutral-point voltage $V_N$, on the other hand, has a frequency about three times higher than the basic wave voltage, that is, the cathode voltage $V_1$ of the thyristor 5 due to the third high harmonic.

In FIGS. 7(a) and 7(b), the period during which the fully-conducted thyristor 5 and the neutral point thyristor 22 are turned on, that is, fired is equal to the period ($T_1$ and $T_2$) during which the voltage is zero in the diagrams of FIGS. 7(a) and 7(b).

The one-phase output voltage between the cathode side of the thyristor 3, 4 and the negative side of the battery 12 has the same waveform as, but is displaced by 120 degree in phase from, the voltage $V_1$ between the cathode side of the thyristor 5 and the negative side of the battery 12 in FIG. 7(a).

Assuming that the basic wave has a frequency of f, the frequency of the neutral-point voltage is 3f. One period of the basic wave is thus given as 1/f, which represents the period $2T_1$, that is, the period twice $T_1$ in FIG. 7. Also, one period f the neutral-point voltage is ⅓f, which represents a period twice $T_2$, that is, $2T_1$ in FIG. 7.

The neutral-point voltage is generated in the waveform of the voltage in direction of $V_{N1}$ indicated by arrow in FIG. 5, only once during the period $T_1$ when a voltage waveform of a specific phase, such as the waveform of the above-mentioned voltage $V_1$, causes a current flow, that is, during the period $T_1$ when the thyristor 5 is conducting (this voltage $V_{N1}$ represents such a voltage generated during the period when the voltage in +B direction is rising in FIG. 7(b)).

In FIG. 7(b), the time $T_2$ represents the period during which a neutral-point voltage of the same phase as but opposite in direction to the arrow $V_{N1}$ is generated in the armature winding 2.

During the period $T_1$ when current is flowing with the thyristor 5 of a phase turned on, an output current flows from the neutral point 9 by the neutral-point voltage $V_{N1}$ through the thyristor 5. In other words, the neutral-point current of the armature winding 2 flows from the coil 2c in the direction of arrow ia.

More specifically, only once during the period $T_1$ when the thyristor 5 is turned on, the voltage $V_{N1}$ causes the neutral-point current ia to flow through the thyristor 5 along the route including the neutral point 9, terminal 1d, neutral-point diode 21, battery 12, thyristor 5 (and actually also through the thyristor 3 which is also turned on at the same time), coil 2c and the neutral point 9.

As a consequence, the neutral-point current flows through the thyristor 5 by the voltage $V_{N1}$ only during one sixth of the period $2T_1$ of the basic wave.

In the process, the current flows through the neutral-point diode 21, and therefore, the neutral-point thyristor 22 is required to be turn off.

In the embodiment under consideration, the thyristor 22 is turned on during the period noted with arrows $T_2$, $T_{21}$, $T_{22}$, $T_{23}$, ... in FIG. 7(b).

At the time point $t_1$ when the thyristor 5 is turned on, the neutral-point thyristor 22 is turned on, and at the time point $t_2$ displaced by 120° from it, the thyristor 3 is turned on though not shown in FIG. 7, while the neutral-point thyristor 22 is turned on at the same time.

Further, at the time point $t_3$ further displaced by 120°, the thyristor 4 is turned on, and the neutral-point thyristor 22 is turned on again.

In this way, the thyristor 22 is turned on at 120° intervals when the thyristors 3, 4, 5, 22 are controlled under full conduction (that is, with firing signals kept applied thereto). In FIG. 7, therefore, the thyristors 3 and 5 are on during the time $T_{21}$, and both the thyristors 3 and 4 on during the period $T_{22}$.

During the period $T_{23}$ or $T_2$, on the other hand, the thyristors 4 and 5 are kept on.

Specifically, it is during the period when any two of the three thyristors 3, 4, 5 of the current circuit 20 are kept on that the neutral-point thyristor 22 is turned on.

To summarize, in the circuit of FIG. 5, when the thyristors are controlled all to conduct like diodes, the thyristors 3, 4, 5 are sequentially turned on and off, and the neutral-point thyristor 22 conducts only during the period when any two of the thyristors 3, 4, 5 are kept on at the same time.

When the three-phase AC output of the armature winding 2 if full-wave rectified while the thyristors 3, 4, 5 are under phase control, the neutral-point current ia caused by the voltage $V_{N1}$ flowing through the neutral-point diode 21 flows through any conducting two of the thyristors 3, 4, 5 only during such conduction, and therefore, the neutral-point current ia is also subjected to phase control by the effect of the phase-controlled thyristors 3, 4, 5.

When a neutral-point voltage opposite in direction to the voltage $V_{N1}$ is generated, by contrast, the neutral-point current ib fails to flow as shown in FIG. 5 unless the neutral-point thyristor 22 is turned on.

The neutral-point current is taken out through the neutral-point thyristor 22 only three times at times points $T_2$, $T_{21}$ and $T_{22}$ within one period $2T_1$ of the basic wave during the period when any two of the thyristors 3, 4, 5 are kept on even if the thyristors 3, 4, 5 are controlled under full conduction as explained with reference to FIG. 7.

Assuming that a conduction command, that is, a firing signal is applied to the neutral-point thyristor during the period when any two of the thyristors 3, 4, 5 are supplied with a conduction command that is a firing signal, therefore, the neutral-point current ib fails to flow unless the phase-controlled current flows through any two of the thyristors 3, 4, 5, so that the neutral-point current is also phase-controlled when the thyristor 3, 4, 5 are phase-controlled.

In phase control of the neutral-point thyristor 22, therefore, there is no need to configure a complex phase control circuit with a special firing signal by picking up voltage variations at the neutral point, but it is possible to produce a phase control signal d of the neutral-point thyristor by logic processing of the phase control signals (a, b, and c in FIG. 6) for the thyristors 3, 4 and 5.

Specifically, it is sufficient to configure in such a manner that the phase control signal d is produced for the neutral-point thyristor 22 when phase control signals are applied to any two of the thyristors 3, 4 and 5.

In a configuration for realizing this operation shown in FIG. 6, numeral 23 designates a first phase control circuit, and numeral 27 a second phase control circuit including a logic circuit.

In view of the requirement that two of the thyristors are turned on at the same time, the neutral-point thyristor is fired between the firing angles 120° and 180° of a specific thyristor in the circuit 20.

For taking out the neutral-point output, therefore, the gate of the neutral-point thyristor 22 is fired at such a timing as in the portions where the firing angles of two thyristors in the circuit 20 are overlapped one over the other as shown in FIG. 8(d).

FIGS. 8(a) to 8(c) show waveforms of the firing signals for firing the thyristors 3, 4, 5 of the circuit 20 having a firing angle α corresponding to the control output voltage synchronous with the outputs of the magnet-type generator 1.

The firing angles have a phase difference of 120°. Since the firing signal (FIG. 3(d)) of the neutral-point thyristor 22 is associated with the period when the firing signals of two thyristors are overlapped one over the other as explained above, however, the logic product of the signals (a) and (b), (b) and (c), and (c) and (a) are taken, and these three logic products are applied through an OR circuit to produce a logic sum thereof.

As a result, the firing signal for the neutral-point thyristor 22 is obtained as shown in FIG. 3(d).

In this way, the third high-harmonic component is taken out with phase control within the turned-on time of the neutral-point thyristor 22 without fail.

This process will be explained with reference to FIGS. 9(a) to 9(c). FIGS. 9(a) to 9(c) show a case where the firing angle α of the thyristors 3, 4, 5 of the composite bridge 20 are as large as holds relations 120° ≦α≦180°. Of these diagrams, FIG. 9(a) shows the cathode voltage (Vhd 1) of the thyristor 5 of the composite bridge 20 based on the negative side of the battery 12, FIG. 9(b) the cathode voltage ($V_N$) of the neutral-point thyristor 22, and FIG. 9(c) the current due to the high harmonic wave component flowing in the neutral point thyristor 22.

The neutral-point thyristor 22 is fired only during the period when the firing angles of two of the three thyristors 3, 4, 5 making up the composite bridge 20 are overlapped one over the other.

The cathode voltage of the thyristor 5, which is shown in FIG. 9(a), is produced in a value other than zero volt only when the thyristor 5 is off, while it becomes a voltage of substantially zero volt in FIG. 9(a) when the thyristor 5 is on.

FIG. 9(a) shows the case in which the firing angle α is 150°, indicating that the thyristor 5 is turned on at the time point $t_{41}$ that is 30° from the time point $t_{11}$.

Assume that the thyristors 3 and 4 are also controlled at the firing angle α of 150° at this timing though not shown. In that case, the thyristor 5 is turned on at time point $t_{41}$, followed by the thyristor 3 being turned on 120° later, further followed by the thyristor 4 being turned 120° later.

The thyristor 3 is thus turned on at the time point $t_{42}$ that is 120° later than $t_{41}$, though not shown in the drawing.

Both thyristors 5 and 3 are kept on, therefore, during the period $T_{31}$ representing 30° from the time point $t_{42}$. In similar manner, it is during the period of $T_{32}$ that both the thyristors 3 and 4 are kept on, and it is during the period $T_{33}$ or $T_3$ that the thyristors 3 and 5 are both on.

Only during these periods $T_3$, $T_{31}$, $T_{32}$, $T_{33}$, and so on, representing 30° respectively, the neutral-point thyristor 22 is impressed with a firing signal from the amplifier 32 of FIG. 6, and is conducted to supply the neutral-point current ib by the voltage in the direction opposite to $V_{N1}$ in the diagram of FIG. 5.

In other words, $T_3$, $T_{31}$, $T_{32}$, $T_{33}$ and so on represent the period during which the neutral-point thyristor 22 is kept on, so that it is possible to take out the neutral-point output associated with these periods (third high harmonic) by phase control as current component ib shown in FIG. 9(c).

(Fourth Embodiment)

Now, a fourth embodiment will be explained below.

The above-mentioned third embodiment illustrates a configuration in which the common terminal (anode terminal) of the thyristors 3, 4, 5 of the circuit 20 and the anode terminal of the neutral-point thyristor 22 are connected to the negative side of the battery 12, while the common terminal of the diodes 6, 7, 8 and the cathode terminal of the neutral-point diode 21 are connected to the positive side thereof. A similar phase control covering the neutral-point voltage is realizable also by a configuration opposite to that shown above, in which as shown in FIG. 10, the common cathode terminal of the thyristors 3, 4, 5 of the circuit 20 and the cathode terminal of the neutral-point thyristor 22 are connected to the positive side of the battery 12, and the anode terminal of the neutral-point diode 21 to the negative side of the battery 12.

Unlike in the above-described third and fourth embodiments which assume a three-phase AC magnet-type generator, the present invention is of course applicable with equal effect to a magnet-type generator of multiple phases including six phased.

Figure 10:
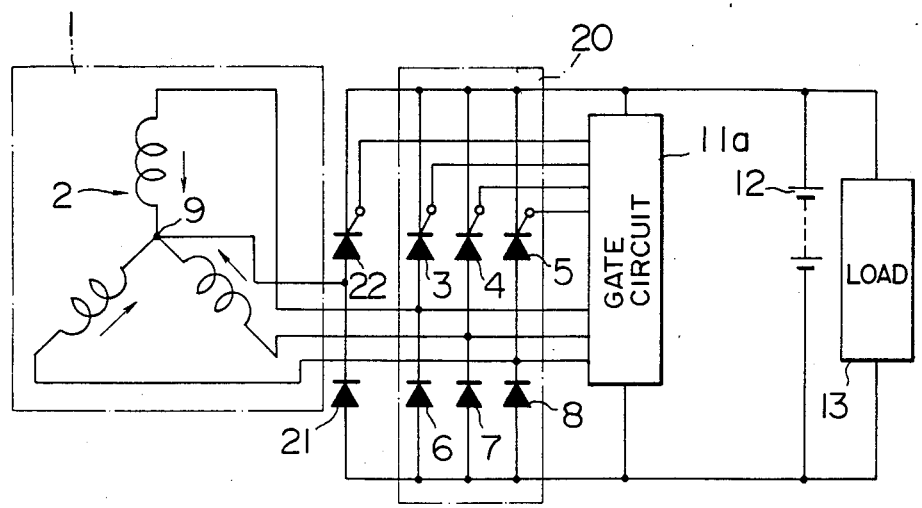
FIG. 10 is an electrical circuit diagram showing a fourth embodiment of the present invention.
Figure 11:
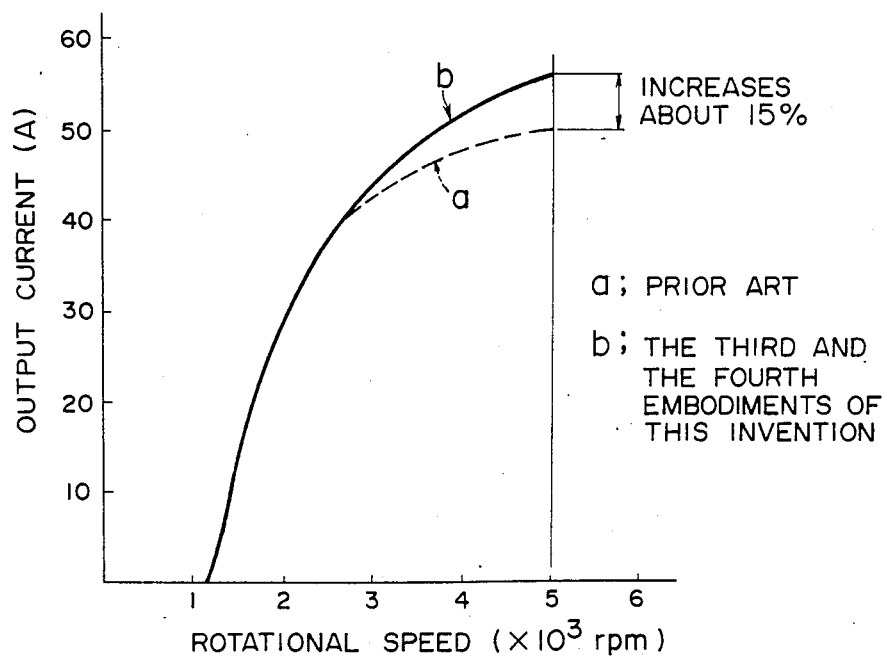
FIG. 11 is an output characteristic diagram for comparing the output characteristics of the third and fourth embodiments with those of the conventional system shown in FIG. 4.

Further, as seen from the characteristic diagram of FIG. 11 comparing the output characteristic of a conventional system shown in FIG. 4 with that of the system shown in FIG. 5, the output current of the system according to the fourth embodiment shown in Fig. 10 is larger by about 10%. This is by reason of the fact that the third high-harmonic voltage generated at the neutral point by the armature reaction is phase-controlled through a neutral-point diode and a neutral-point thyristor, and also full-wave rectified.

We claim:

1. A rectifying system for a magnet-type AC generator which feeds a battery and which has an armature winding of multiple phases having a neutral point, comprising:

rectifier means, including a composite bridge having a plurality of thyristors and a plurality of diodes, for regulating and rectifying an output voltage of the AC generator, said plurality of diodes being connected to one electrode of the battery and said plurality of thyristors being connected to an other electrode of said battery in common;

a neutral-point diode inserted only between said neutral point of said armature winding and said one electrode of said battery connected with the plurality of diodes in common, the output of said neutral point being rectified through said neutral-point diode, said output voltage of said neutral point being regulated by said plurality of thyristors, said output voltage of the neutral point being applied to said battery through said neutral-point diode, whereby a current flowing at the neutral point of said armature flows to the battery only through said neutral-point diode.

2. A rectifying system for a magnet-type AC generator having an armature winding of multiple phases with a neutral point, comprising a rectifier circuit including a composite bridge of plurality of diodes and a plurality of thyristors for regulating and rectifying the output voltage of said AC generator, said plurality of diodes being connected in common to one of the electrodes of a battery, said plurality of thyristors being connected in common to the other of the electrodes of said battery, a first phase control circuit for applying firing signal to said plurality of thyristors, neutral-point diode inserted between said neutral point of said armature winding and said one of the electrodes of said battery connected with the plurality of diodes in common, a neutral-point thyristor inserted between said neutral point and said other of the electrodes of said battery connected with said plurality of thyristors in common, and a second phase control circuit for controlling the phase of said neutral-point thyristor, said neutral-point thyristor being phase-controlled, said voltage applied to said battery being regulated through said neutral-point thyristor.

3. A system according to claim 2, wherein said second phase control circuit includes a logic circuit for processing a phase control signal for said first phase control circuit and producing a phase control signal applied to said neutral-point thyristor.

4. A system according to claim 3, said logic circuit comprising three AND circuits each for producing the logic product of any two of the phase control signals of said first phase control circuit, and an OR circuit for producing a logic sum of the outputs of said AND circuits.

* * * * *